United States Patent [19]

Fitzgerald

[11] 4,077,572
[45] Mar. 7, 1978

[54] REDUCED SIZE ALTITUDE INSENSITIVE THRUST VECTOR CONTROL NOZZLE

[75] Inventor: Robert Edward Fitzgerald, Wethersfield, Conn.

[73] Assignee: Chandler Evans Inc., West Hartford, Conn.

[21] Appl. No.: 670,164

[22] Filed: Mar. 25, 1976

[51] Int. Cl.² .................. B63H 25/46; B64C 15/10
[52] U.S. Cl. .................. 239/265.17; 60/231; 137/825
[58] Field of Search .................. 239/265.11, 265.19, 239/265.23, 265.39, 265.17; 137/806, 825, 833, 835, 836, 837, 842, 839; 60/231

[56] References Cited

U.S. PATENT DOCUMENTS

| 2,956,400 | 10/1960 | Ferri | 239/265.39 |
| 3,177,888 | 4/1965 | Moore | 137/839 |
| 3,187,763 | 6/1965 | Adams | 137/835 |
| 3,267,949 | 8/1966 | Adams | 137/839 X |
| 3,325,103 | 6/1967 | Abbott | 239/265.23 X |
| 3,421,324 | 1/1969 | Bains | 239/265.23 X |
| 3,995,662 | 12/1976 | Fitzgerald et al. | 60/231 X |

Primary Examiner—Evon C. Blunk
Assistant Examiner—Andres Kashnikow
Attorney, Agent, or Firm—Radford W. Luther; Richard A. Dornon

[57] ABSTRACT

An overexpanded thrust vector control nozzle has a converging extension section downstream of the jet exhaust stream deflecting section for defining a restriction or orifice. The orifice functions to elevate the exhaust pressure in the deflection section, which permits a reduction in nozzle size for operation at high and low altitudes. The orifice, which isolates the deflection section from outside ambient pressure, receives a deflected exhaust stream after it is turned in the direction opposite to that of the original stream deflection by the wall of the converging section. Control ports, which are adapted to communicate with a source of pressurized control fluid, are provided in the deflection section to position the exhaust stream.

7 Claims, 5 Drawing Figures

REDUCED SIZE ALTITUDE INSENSITIVE THRUST VECTOR CONTROL NOZZLE

BACKGROUND OF THE INVENTION

This invention relates to thrust vector control nozzles.

In order to maintain thrust vector control by generating sufficient lateral forces in overexpanded nozzles, larger nozzle sizes are required at high altitudes than that which will suffice at lower altitudes. This is because the ratio of combustion chamber pressure to ambient pressure increases with altitude. For example, with a given chamber pressure, while a nozzle exit area to throat area ratio of 4 may be satisfactory for that vector control at low altitudes, a ratio of 600 or more may be necessary at higher altitudes. Since minimal missile nozzle size is always desirable (even at low altitudes), if not essential, in view of missile weight and envelope limitations, there is a need for a small nozzle capable of furnishing the required transverse control forces at sea level and particularly at high altitudes. An example of a prior art overexpanded nozzle is shown in U.S. patent application Serial No. 263,843, entitled "Fluidic Switches", filed on June 16, 1972, and now U.S. Pat. No. 3,995,662.

SUMMARY OF THE INVENTION

The invention provides a thrust vector control nozzle which is smaller than comparable prior art nozzles and has the inherent capability to generate sufficient transverse forces for vehicle control at sea level, high altitudes and in the vacuum of space.

A nozzle of the invention, which may be of two-dimensional or three-dimensional design, comprises a throat section which communicates with a first or stream deflection section having at least one control port connected to a source of pressurized control gas via a valve. A second or converging section commences at the exit plane of the first section and tapers down to define a flow restricting orifice adjacent its exit end. The function of the second section of the nozzle is to isolate the first section of the nozzle from the ambient environment, be it constituted by a liquid or a gas, whereby a reasonable pressure ratio (such as slightly greater than 2:1) may be maintained between combustion chamber pressure and the pressure in the deflection section to allow for reduced nozzle dimensions.

The nozzle of the invention is designed such that when all of the control ports are closed, the exhaust stream emanating from the throat becomes sufficiently overexpanded to occasion separation from the wall of the first section in the vicinity of the control ports. The undeflected stream, whose axis is coincident with that of the nozzle, then proceeds into the second section where it impinges upon an intermediate wall portion thereof and exits into the ambient atmosphere via the orifice with its axis still coincident with that of the nozzle.

In an embodiment of the invention, when one of the control ports is open, the jet exhaust stream then deflects and attaches to the wall of the first section opposite the open control port and proceeds thence into the second section where it impinges upon the adjacent wall portion of the converging section which functions to turn the flow inwardly.

The exhaust stream then continues along the wall of the second section to emerge from the orifice at an angle to the nozzle's axis as determined by the rate of convergence of the second section, whereby a transverse control force is generated. Closing the open control port causes the deflected exhaust stream to snap back to its undeflected position, and a subsequent opening of an opposite or juxtaposed control port causes a switching action as previously described which produces a different transverse control force.

A nozzle of the invention exhibits not only an altitude insensitivity but also permits a jet exhaust to be switched between deflected and undeflected positions or between deflected positions at a high frequency employing a small control flow and is therefore well suited for inclusion in control systems employing pulse width modulation, pulse frequency modulation, or pulse ratio modulation.

Accordingly, it is a primary object of the invention to provide a small thrust vector control nozzle capable of generating acceptable transverse control forces at high altitude and in outer space.

Another object is to provide a thrust vector control nozzle having an orifice to isolate the deflection section thereof from the ambient atmosphere such that a reasonable pressure ratio may be maintained at high altitude with a reduced nozzle size.

Still another object is to provide a thrust vector control nozzle in which a jet exhaust stream emanating from the throat thereof may be rapidly switched between deflected and undeflected positions or between deflected positions.

A further object is to provide a thrust vector control nozzle for a flight vehicle adapted to be operated at low and high altitudes and in the vacuum of outer space.

A still further object is to provide a two-dimensional or three-dimensional thrust vector control nozzle.

These and other objects and advantages of the invention will become more readily apparent from the following detailed description, when taken in conjunction with the accompanying drawings, in which:

DETAILED DESCRIPTION OF PREFERRED EMBODIMENT

Figure 1:
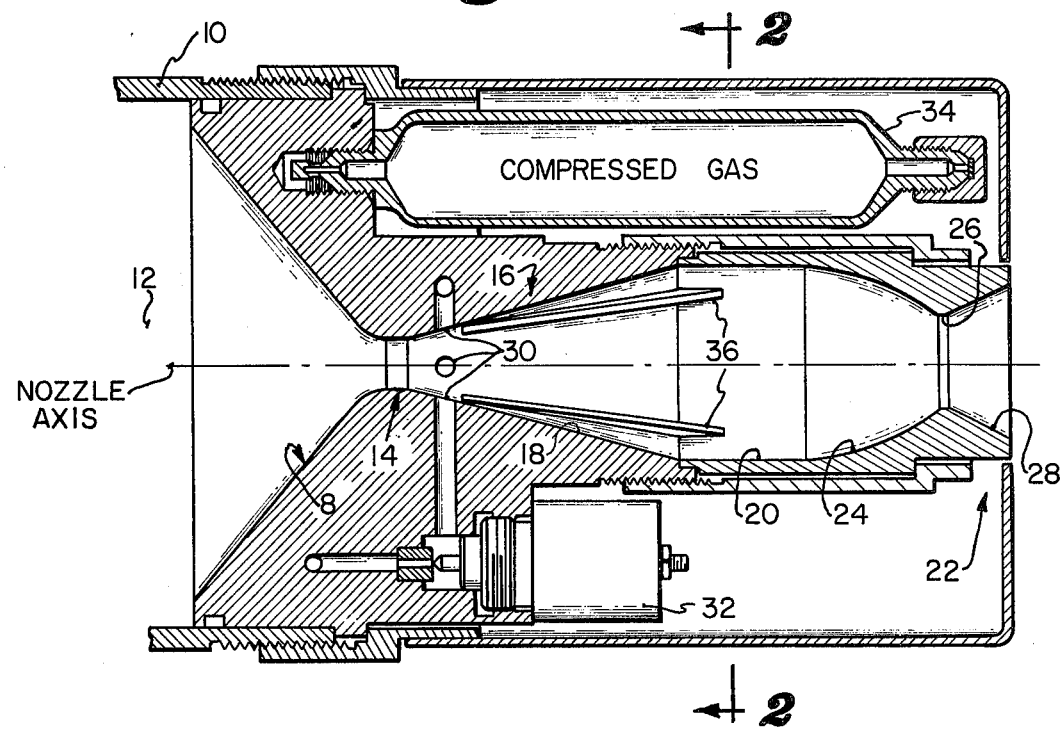
FIG. 1 shows a longitudinal sectional view of nozzle arrangement of the invention mounted in the rear end of a flight vehicle.

Turning now to the drawings, there is shown in FIG. 1 a preferred nozzle of the invention having an interior wall 8 mounted in the aft end of a flight vehicle, shown as a missle 10. The illustrated nozzle of the invention is three dimensional in design and defines a surface of revolution.

A combustion chamber 12, which serves as a source of propulsive gas under pressure, communicates with a throat section 14 with a converging-diverging interior wall through which a jet exhaust stream from the chamber is directed. The throat section 14 of the nozzle merges smoothly into a jet exhaust stream deflection section, generally shown at 16, which comprises a first upstream conical interior wall portion 18 and a second downstream cylindrical interior wall portion 20. An extension section, generally indicated at 22, abuts the downstream end of the deflection section 16. Extension section 22, which functions to elevate the pressure in the deflection section 16, comprises a converging interior wall portion 24, which terminates in an orifice 26 and a diverging exit interior wall portion 28 extending beyond the orifice. The three sections 14, 16, and 22 define a continuous interior nozzle wall which in the downstream direction, converges, diverges, remains parallel to the nozzle axis, converges and finally diverges.

Figure 2:
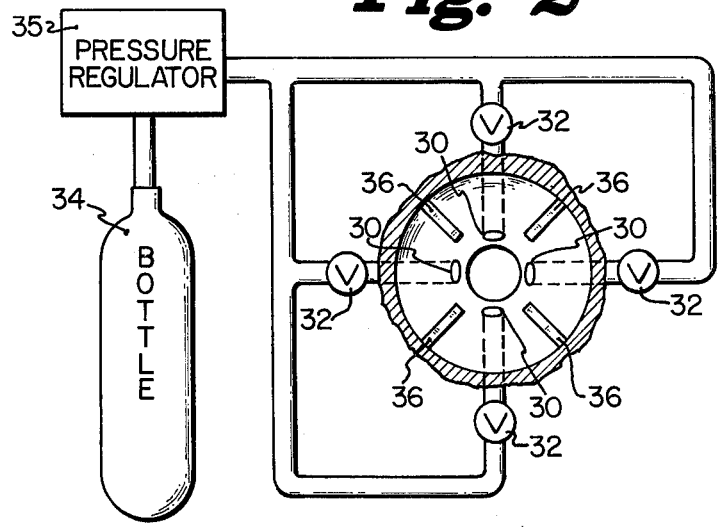
FIG. 2 is a schematic transverse sectional view of the nozzle, taken along the line 2—2 of FIG. 1.

The deflection section is provided with a plurality of control ports 30, which lie in a common plane transverse to the nozzle axis and are preferably equally spaced in a circumferential sense as depicted in FIG. 2. The control ports 30 each communicate with a source of pressurized control gas via respective solenoid operated valves 32. Typically, the source of pressurized control gas will take the form of a bottle 34 containing a compressed inert gas as shown in FIG. 1.

A pressure regulator 35 may also be fluidly interposed between the bottle 34 and the valves 32, as illustrated in FIG. 2.

In the interest of promoting switching of the jet exhaust stream, it is important to locate the ports at or at least near the location where free stream separation would occur. The free stream separation location is that point where an unattached exhaust stream would separate from the conical wall 18 when no ports are incorporated therein. This free stream separation location may be determined by utilizing experimental data obtained, for example, as described in an article entitled "Jet Separation in Conical Nozzles" by Sunley et al, Journal of the Royal Aeronautical Society, Vol. 8, Dec., 1964, at pages 808 – 818. This article teaches the manner of predicting the pressure ratio at the free stream separation point. When this pressure ratio has been computed, the area ratio or actual free stream separation point for the particular nozzle geometry can be obtained by reference to the "Gas Tables" of Kennan and Kaye, published by John Wiley and Sons Company, Inc. in May, 1948. Alternatively, the separation location may be determined purely experimentally by coating the interior nozzle wall with an oil and graphite mixture and physically observing the circular line of demarcation between separated and attached flow.

Although the general axial location of the ports 30 will be in the vicinity of the unattached free stream separation location, their exact location for proper operation is a function of the pressure ratio between the combustion chamber 12 and the deflection section 16. It must be stressed in this regard that the proper port location is exceedingly critical and the tolerances associated therewith are small. Of course, it will be understood by those skilled in the art that port location may be determined experimentally by trial and error. Alternatively, the ports may be placed at the separation location and the size of the orifice 26 adjusted until satisfactory switching characteristics have been achieved. This latter method, of course, involves adjusting or tuning the aforementioned pressure ratio.

When an exhaust stream exiting into the nozzle deflection section 16 from the throat section 14 attaches to a wall portion thereof, a separation or low pressure bubble is believed to be formed somewhere on the wall of portion 18 of the deflection section 16 by separation and subsequent reattachment. As long as the low pressure bubble is maintained either by sealing or isolating the low pressure bubble or by directing a constant control flow into the section 16 via a port 30 in a wall sector opposite that which the low pressure bubble contacts, the exhaust stream remains deflected by the pressure differential imposed thereacross. It will suffice to note that this area is a region of very low pressure which tends to entrain flow from the higher pressure regions inside the nozzle (circumferential flow) and from outside the deflection section 16 (i.e., section 22 upstream of orifice 26), the latter form of entrainment being termed axial inflow. If the low pressure bubble does in fact tend to entrain flow, as described, this will militate against stable stream deflection.

The problem then is to prevent circumferential flow and axial inflow to the low pressure bubble which would otherwise produce instability in a deflected stream. To this end, the deflection section 16 of the invention is preferably incorporated with the downstream cylindrical portion 20, the reduced divergence of which serves to isolate the low pressure bubble from the higher pressure in the extension section 22. Otherwise, exhaust stream instability would result from the flow of gas into the low pressure bubble from the extension section 22, i.e., counter flowing entrainment flow would pass upstream in the area between the deflected stream and the diverging conical nozzle wall 18 into the low pressure bubble. Such gas would then be pumped or entrained by the exhaust stream. Although the illustrated embodiment shows an abrupt transition between the conical wall portion 18 and the cylindrical wall portion 20, the transition could be more gradual and the portion 20 may even be slightly divergent as long as it is less than that of the wall portion 18.

As noted above, the instability resulting from disruption of the low pressure pocket formed when a control port is closed may also be caused by circumferential flow as well as axial entrainment flow. Thus, a nozzle of the invention may incorporate a plurality of ribs or fences 36 mounted on the inner wall of the deflection section 16. In the embodiment of FIGS. 1 and 2, the section 16 is divided into four sectors, each with its own control port 30 by the provision of four ribs 36. The ribs 36 start at or before the free stream separation point and preferably extend into the cylindrical interior wall portion 20 of the section 16. The height and shape of ribs 36 will be determined by experimentation, with the principal criteria being that the ribs must be of sufficient dimensions to restrict circumferential flow into the low pressure pocket. Thus, the ribs should protrude to a point where they will contact the deflected stream, thereby sealing circumferential flow. As shown in FIGS. 1 and 2, the ribs 36 are of rectangular shape and increase in height in the downstream direction through the conical portion 18 of the deflection section 16. The ribs 36 may, however, assume other shapes. Thus, the ribs could increase in width toward the discharge end of the section 16 or could actually be in the form of "flats" in the nozzle wall for all or a substantial portion of their length.

The extension section 22, in addition to elevating the nozzle pressure to allow for a reduced nozzle size at low ambient pressures, also functions to turn the exhaust stream back toward the nozzle axis. This is accomplished by the converging wall portion 24 of the section 22.

The size of the orifice 26 of the section 22 may be determined as follows: Assuming both throat section 14 and orifice 26 are flowing sonic or choked, the pressure in the deflection section 16 is less than one half of the pressure in the combustion chamber 12. Also, the ambient pressure is less than one half of the pressure in the deflection section 16. With pressures and the area of the throat of throat section 14 determined by the mandated thrust and motor characteristics, the area of orifice 26 can easily be determined since the combustion chamber pressure times the throat area is about equal to the pressure in the deflection section times the area of orifice 26. While the actual flow through orifice 26 may not be sonic, it may be assumed to be so for design purposes.

After traversing the orifice 26, the turned flow exits to the ambient atmosphere via the diverging portion 28 of the extension section 22. It is desirable to furnish the extension section 22 with a diverging portion as shown in FIG. 1 because additional thrust is generated as in a conventional nozzle.

Figure 3:
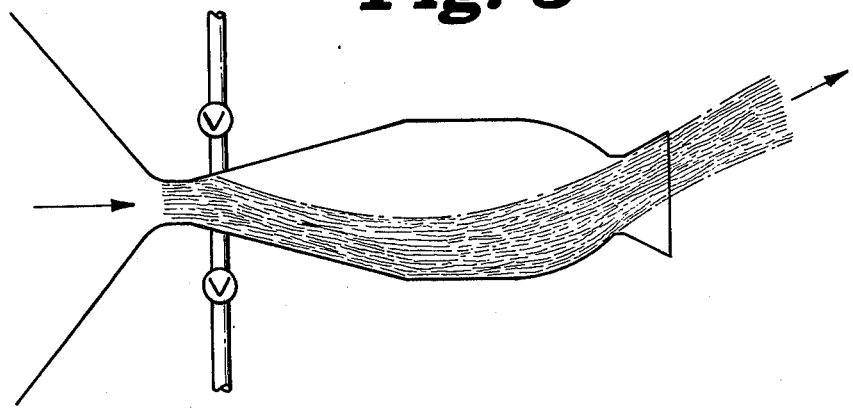
FIGS. 3 and 4 are respective schematic views of two-dimensional nozzle operation when the jet exhaust stream is attached to a sector of the interior wall of the nozzle and attached to an opposite sector thereof.

The preferred mode of operation of the illustrated embodiment (with ribs 36) is as follows: Gas from the combustion chamber 12 emanates from the throat section 14 in which it achieves sonic velocity (flowing choked) as a jet exhaust stream at supersonic velocity. However, prior to the commencement of gas generation one of the ports 30 will have been placed in communication with the source of pressurized control gas (i.e., bottle 34) by opening the valve 32 which is associated therewith. The issuing jet will thereby attach to the wall sector of section 16 which is opposite the control port 30 communicating with the bottle 34. The communicating control port may now be closed to conserve the compressed gas supply with the jet remaining attached to the wall sector of section 16 to which it was originally attached. Such a flow condition is depicted in FIG. 3 in which it will be noted that the upper port was the open port and that the attached flow follows the contour of the opposite wall sector whereby the deflected or attached jet is directed away from the nozzle axis, parallel to the nozzle axis, toward the nozzle axis and away from the nozzle axis after the crossing thereof at orifice 26. The deflected jet from the orifice 26 (in which the flow may or may not be sonic) produces a thrust vector having a lateral component and an axial component.

Figure 4:
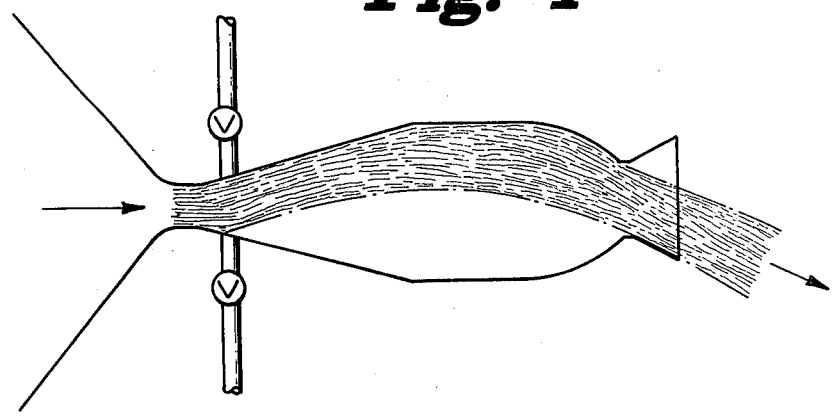
Figure 5:
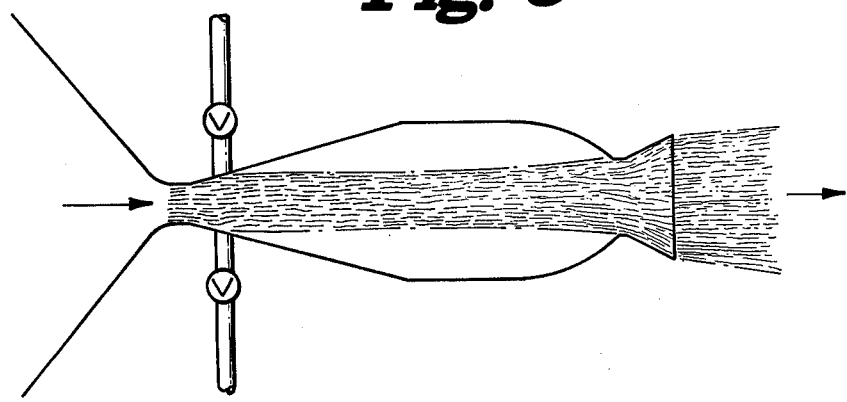
FIG. 5 is a schematic view of operation of another embodiment of the invention where the ribs are omitted, and all ports are closed.

As previously mentioned, operation in the stable mode shown in FIG. 3 may continue indefinitely with all ports closed. Suppose now that a lateral thrust force is needed in the direction opposite to that which is being generated by the jet of FIG. 3. Switching of the jet is easily effected by opening the valve 32 which is associated with the lower port 30. This action produces a pressure differential across the jet which induces the jet to snap over to the opposite wall sector and assume the flow pattern of FIG. 4, which, of course, is opposite to that of FIG. 3. To occasion this switching of the jet, the lower valve need only be open for a fraction of a second, after which it may be closed. In FIG. 4, the switched jet produces an axial thrust component as is engendered in FIG. 3, but produces a lateral thrust component opposite to that previously described.

In order to switch the jet from the attached position of FIG. 4 to an attached position below the plane of the paper the left port 30 of FIG. 2 is opened and closed. Conversely, to switch the jet from the attached position of FIG. 4 to an attached position above the plane of the paper, the right side port 30 of FIG. 2 is opened and closed.

In the illustrated embodiment, a jet issuing from the throat section 16 may then assume any of four stable positions and switched therebetween as desired. Such switching may be carried out a high frequency (e.g., 100 HZ.) to provide for pitch control, yaw control or both. For yaw control the jet is switched between the side wall sectors, as viewed in FIG. 2; and for pitch control, the jet is switched between the top and bottom wall sectors of FIG. 2.

The switching operation will be described with reference to yaw control where the side valves of FIG. 2 are rapidly pulsed open and closed in a mutually exclusive manner. During yaw control the jet snaps between the opposite side wall sectors at a rapid rate. For no lateral yaw control thrust to be generated, the duration of jet attachment to a side wall sector must be equal to the duration of side wall attachment on the opposite wall sector. In this situation, the direction of the lateral thrust component is successively being switched between opposite directions with the respective force time durations equal. However, should the time duration of attachment be greater on one side wall sector than on the other side wall sector in a given cycle, then the nozzle will tend to move in the direction of the side wall sector which has the greater time duration of attachment. Pitch control is achieved in a similar manner.

It has been found that it may be difficult or impossible to provide for a stable axial jet in the illustrated nozzle in addition to the four stable attached positions. Hence, when all ports are closed or all ports are open, the jet will not necessarily assume a stable centrally disposed orientation with its axis coincident with the nozzle axis, but may respectively attach to a wall sector in an unpredictable manner (all ports closed) or oscillate about the nozzle axis (all ports open). The reason for exhibiting such behavior is that the ribs encourage attachment.

If the application for which a nozzle of the invention is selected mandates a stable axially aligned jet, removal of the ribs 36 will permit achievement of this objective. With the ribs removed and all ports closed, the axis of a jet issuing from the throat section 14 will be coincident with the nozzle axis. When a port is opened, the jet (which is preferably supersonic) will attach to a wall sector in opposite relationship thereto as is the case of a nozzle with ribs. However, in order to maintain such an attached state, the opened port must remain open, expending the control gas, albeit a small amount.

The reason for this is that the control flow from the opened port creates shocks which tend to seal off the low pressure bubble. When the opened port is closed, the previously engendered shocks disappear, whereby the jet returns to its axially aligned position.

To switch the stream to another wall sector, the first opened port must be closed and a second port, opposite the selected sector of attachment, opened and, of course, maintained open for the desired period of attachment. Hence, this second embodiment of the invention, although using more control gas under certain circumstances provides a jet exhaust stream with a stable centrally disposed orientation in addition to a plurality of attached positions. With all ports open, it should also be possible to have the emanating jet assume a stable axially aligned position, providing the flows through the ports are equal.

In the second embodiment of the invention it is unnecessary to pulse the valves open and closed in a mutually exclusive fashion as with the first described embodiment to provide for pitch or yaw control. In the latter embodiment, only one valve need be pulsed for generating control forces for moving the nozzle toward the attached wall sector.

It should also be noted that in the second embodiment of the invention, proportional deflection of the exhaust stream is possible with varying flows from the control ports. Hence, if proportional solenoids are employed to control the valves, varying deflection angles of the exiting exhaust stream may be attained.

Obviously, many modifications and variations are possible in view of the above teachings without departing from the scope or spirit of the invention as defined in the subjoined claims. For example, the number of control ports in a nozzle of the invention could be more or less than the number illustrated. Furthermore, the control system (be it mechanical, electrical or fluidic) for operating the valves admits of numerous variations. Also, while in the preferred embodiments, the throat 14 preferably flows choked, a mode of operation wherein a subsonic jet exhaust stream emanates from the throat 14 is within the ambit of the invention.

I claim:

1. A thrust vector control nozzle arrangement which comprises:
    a nozzle having: a throat section with a converging - diverging interior wall; a deflection section connected to the downstream end of the throat section with an interior wall comprising a first divergent interior wall portion and a second interior wall portion downstream of the first wall portion, the first wall portion having a greater divergence than the second wall portion; and an extension section connected to the downstream end of the deflection section with a convergent interior wall portion which terminates to define a flow restricting orifice;
    means to cause a jet exhaust stream of gas to emanate from the throat section and separate from the first divergent interior wall portion of the deflection section, the orifice being sized to elevate the pressure in the deflection section above ambient pressure;
    at least one control port in the first divergent interior wall portion of the deflection section located in the vicinity of the unattached jet exhaust stream separation location to deliver a control flow for causing the jet exhaust stream to deflect and attach to an area of the first divergent interior wall portion opposite the port;
    a source of pressurized control gas; and
    valve means to establish and terminate fluid communication between pressurized control gas and the control port.

2. An arrangement, as defined in claim 1, wherein the nozzle interior walls are surfaces of revolution and wherein there are a plurality of circumferentially distributed control ports.

3. An arrangement, as defined in claim 2, further including:
    means to restrict circumferential flow to an attached jet exhaust stream for preventing detachment of the jet exhaust stream.

4. An arrangement, as defined in claim 3, wherein the restricting means comprises:
    a plurality of axially extending ribs mounted on the interior wall of the deflection section.

5. An arrangement, as defined in claim 2, wherein the first divergent interior wall portion is conical and the second interior wall portion is cylindrical.

6. An arrangement, as defined in claim 5, wherein the extension section of the nozzle comprises:
    a divergent wall portion immediately downstream of the orifice.

7. An arrangement, as defined in claim 2, wherein the jet exhaust stream is supersonic.

* * * * *